United States Patent
Kelsoe et al.

(10) Patent No.: US 6,717,718 B1
(45) Date of Patent: Apr. 6, 2004

(54) HYBRID OPTICAL DEVICE

(76) Inventors: Wayne Kelsoe, 5966 Monteverde Dr., San Jose, CA (US) 95120; Larry Marshall, 731 Calderon Ave., Mountain View, CA (US) 94041

(*) Notice: Subject to any disclaimer, the term of this patent is extended or adjusted under 35 U.S.C. 154(b) by 70 days.

(21) Appl. No.: 10/113,918

(22) Filed: Mar. 28, 2002

Related U.S. Application Data (60) Provisional application No. 60/279,555, filed on Mar. 28, 2001, provisional application No. 60/275,915, filed on Mar. 14, 2001, and provisional application No. 60/275,913, filed on Mar. 14, 2001.

(51) Int. Cl.[7] .............................. H01S 3/00; G02F 2/02
(52) U.S. Cl. ........................................ 359/333; 359/326
(58) Field of Search ................................. 359/333, 326, 359/330

(56) References Cited

U.S. PATENT DOCUMENTS 6,101,027 A * 8/2000 Lee et al. .................... 359/344
6,462,865 B1 * 10/2002 Chu et al. .................... 359/344
6,577,435 B1 * 6/2003 Bang et al. ................. 359/326

* cited by examiner

*Primary Examiner*—Mark Hellner (57) ABSTRACT

Invention employs a unique combination of semiconductor optical amplifier and nonlinear optical filter to achieve wavelength conversion and regeneration.

20 Claims, 11 Drawing Sheets

HYBRID OPTICAL DEVICE

CROSS-REFERENCES TO RELATED APPLICATIONS

This application claims priority from U.S. Provisional Patent Application No. 60/279,555, entitled "Any-to-any wavelength converter," and filed Mar. 28, 2001; and from U.S. Provisional Patent Application No. 60/275,915, entitled "Any to Any All-optical Wavelength Converter," and U.S. Provisional Patent Application No. 60/275,913, entitled "Pure Optcal 3R Device", both filed on Mar. 14$^{th}$, 2001; the disclosures of which are hereby incorporated by reference in its entirety.

BACKGROUND OF THE INVENTION

All-optical wavelength converters based upon difference frequency generation (DFG) in periodically-poled materials have been described by Chou et al., *Optics Letters*, vol.23, pp.1004–1006, July 1998; and Chou et al., *Optics Letters*, vol.24, pp.1157–1159, August 1999, to which reference is periodically made.

Figure 1:
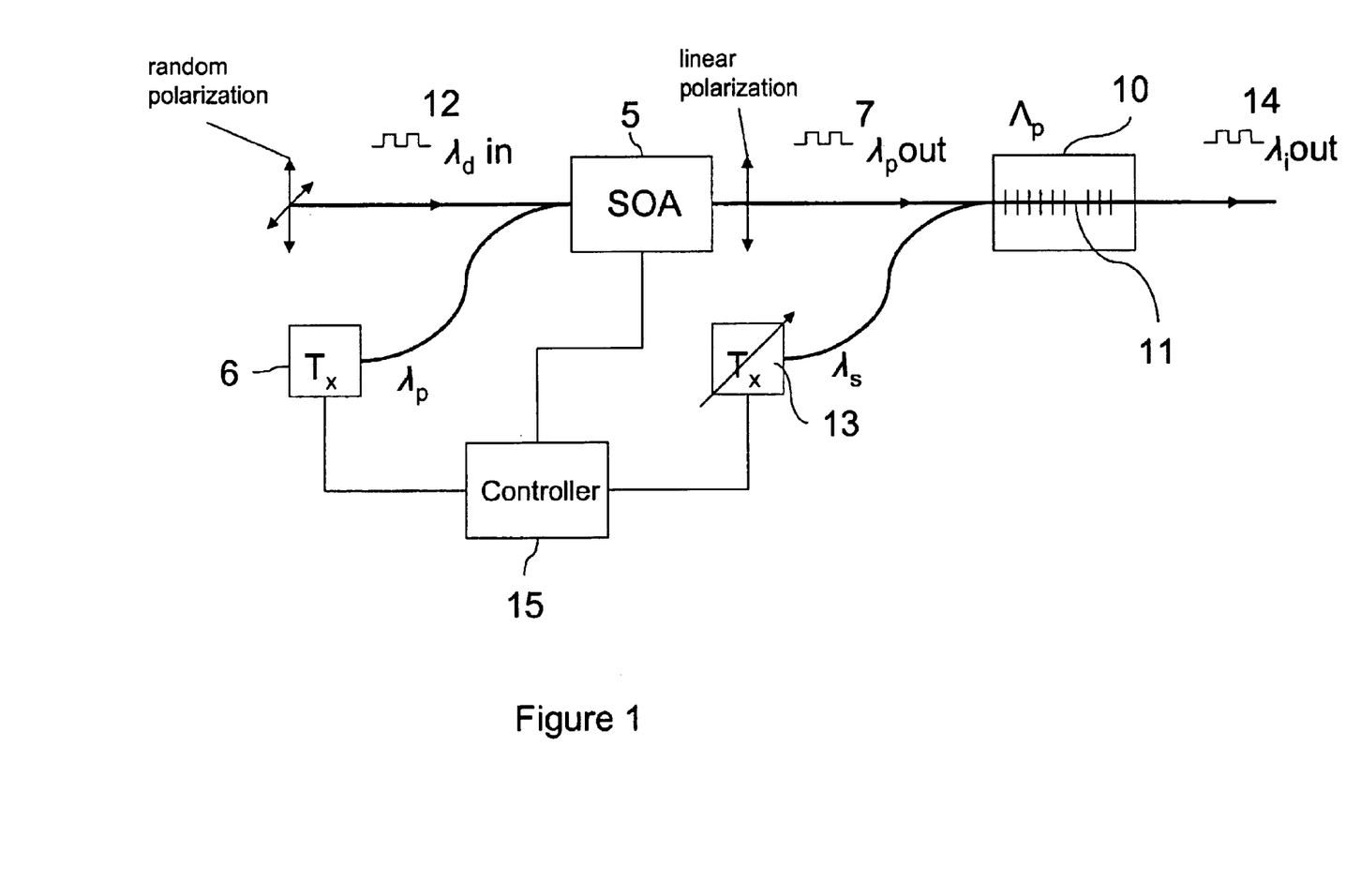
FIG. 1 is a block diagram of the wavelength converter, which includes a semiconductor optical amplifier (SOA) with a CW laser input, and an optical chip with waveguide containing a poled region which frequency doubles the output of the SOA, then difference frequency mixes that doubled pump with a 2nd external optical signal to convert that signal to a new wavelength called the idler. This device can also be thought of as an optical parametric amplifier (OPA)
Figure 1A:
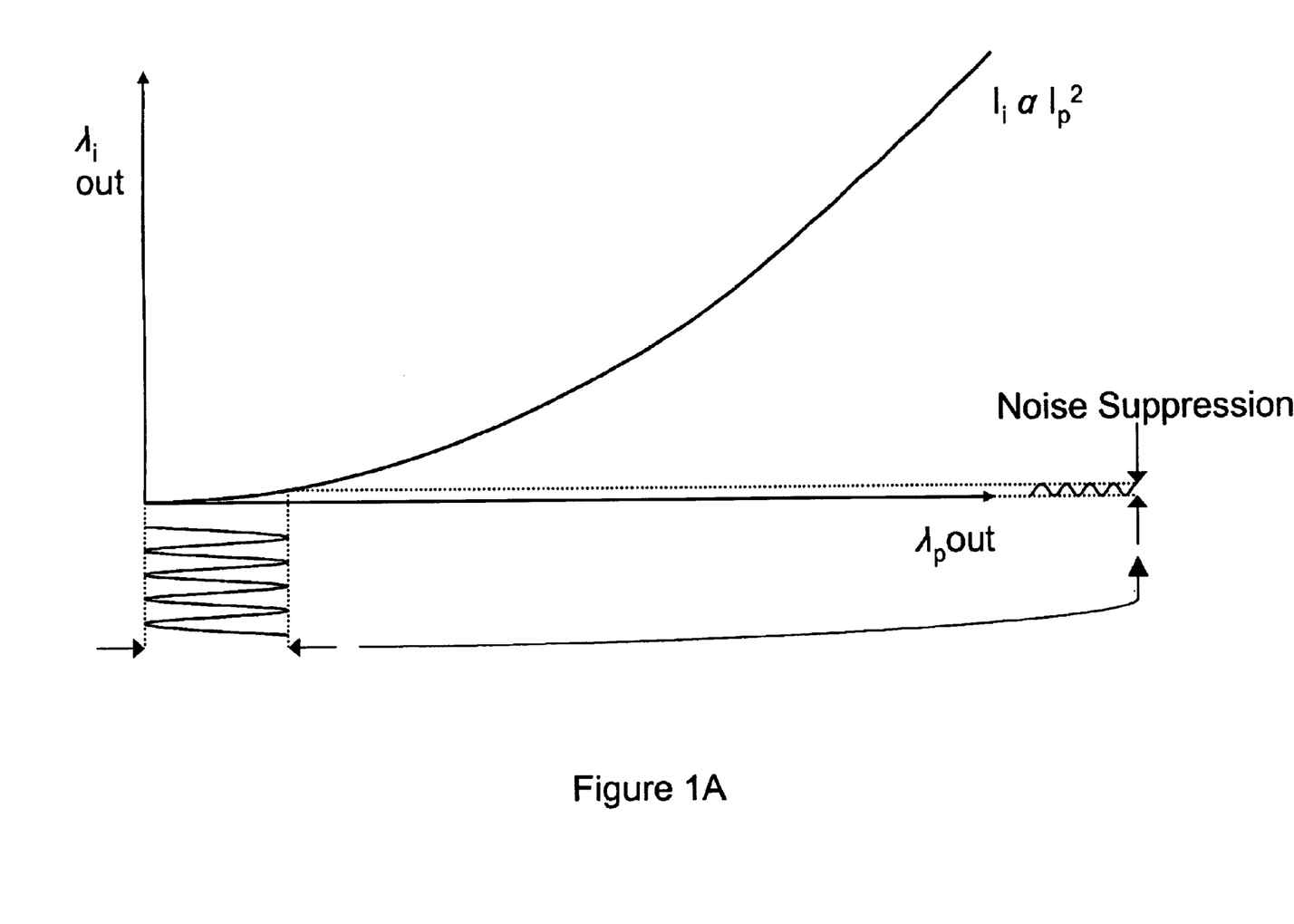
FIG. 1A is a representation of the operation of the nonlinear transfer function of the device and subsequent suppression of noise.

An optical parametric amplifier (OPA) is a more general case of a DFG. From a given pump wavelength, an OPA produces two outputs of different wavelengths whose energies sum to equal the energy of the pump, such as described in U.S. Pat. No. 5,181,211, entitled "Eye-Safe Laser System," which issued to Kasinski et al. For example, a 730 nm pump can generate a signal at 1310 nm and an idler at 1648 nm. FIGS. 1A and 1B illustrates the arrangement and operation of an OPA. In the block diagram of FIG. 1A, the OPA is formed by two parts, a DFG portion and a second harmonic generation portion (SHG) portion, which doubles an ITU (International Telecommunications Union) pump frequency to an equivalent wavelength of $\lambda_p/2$ from which the DFG portion generates an amplified input signal and idler. One can think of an OPA as follows—in frequency space, the pump at frequency $\omega_p$ forms a "mirror" at frequency $\omega_p/2$, and the signal and idler are sidebands or "reflected images" equally spaced on either side of the central pump frequency $\omega_p/2$, as depicted schematically in FIGS. 1A and 1B. In wavelength space as shown in FIG. 1B, the signal and idler wavelengths "mirror" around pump wavelength $\lambda_p$.

For telecommunications applications, in which CW (continuous wave) or weakly modulated signals are used without significant power, the ideal medium for the OPA is a periodically poled substance, such as periodically poled lithium niobate (PPLN), as described by Chou et al., *Optics Letters*, vol.23, pp.1004–1006, July 1998; and Chou et al., *Optics Letters*, vol.24, pp.1157–1159, August 1999. Alternate materials include periodically poled lithium tantalate, or a periodically grown semiconductor material, such as GaAs or InGaAs. The periodic poling achieves non-critical phase matching for a wide range of wavelengths, thereby maximizing the nonlinear gain for even weak CW signals.

The devices described in these papers demonstrate broad acceptance of input signals enabling conversion of a wide range wavelengths, even simultaneously. However, these prior art device are limited to at most four possible wavelength shifts within a single device, and for each additional shift increasing losses are suffered (eg., 2x loss for 2 shifts, 4x loss for 4 shifts). These renders the possibility of an any-to-any wavelength converter remote. Also, the amount of shift varies for a given pump, depending upon the spectral separation of the input signal and pump. This prevents shifting a single channel to any other channel. Even tunable lasers do not enable such an any-to-any device, since only 4 shifts could be allowed in a given chip, far less than the 80 ITU channels that exist today.

Semiconductor optical amplifiers (SOAs) are capable of performing wavelength conversion by mixing a modulated input signal with an external CW laser input, to transfer the modulation from the signal to the CW input through either cross gain or cross-phase modulation, or four-wave mixing within the semiconductor gain medium. These devices suffer from a number of drawbacks including poor extinction ratio (contrast ratio between digital zeros and ones), high added noise, and frequency chirp. Inventors have realized that combining the SOA with DFG can overcome the disadvantages of the SOA and provide a new device with new functionality.

In contrast, the present invention solves these problems, incorporates a new element to enable any-to-any wavelength conversion, and in a sense, reverses what has been done in the prior art to create new functionality and performance from nonlinear optical wavelength converters.

SUMMARY OF THE INVENTION

The present invention provides for all-optical regeneration, reshaping, and retiming of telecommunications data channels independent of bit-rate or protocol. It also provides wavelength conversion capability.

DESCRIPTION OF THE SPECIFIC EMBODIMENTS

The present invention provides for many embodiments and aspects of wavelength converters of the present invention. For purposes of organization and ease of explanation, these embodiments and aspects are separated and headed with subtitles, but should not be considered as limiting the present invention.

Regeneration of "Zero" Bits

In this embodiment the wavelength conversion process reverses the prior-art roles of the pump and input signal, by using the input signal to act as a pump. First, however, the input signal is wavelength converted in an SOA stage. Optical chip 10 has one or more waveguides 11, as shown in FIG. 1. These waveguides can be so-called single channel, or multiple channel (as described in the Chou et al. articles cited above), depending upon the loss level that can be tolerated. Each waveguide has gratings (not shown) which are fabricated with a period $\Lambda_s$ to be resonant with a certain signal wavelength $\lambda_s$, (rather than resonant with the pump as in prior-art). The limitation of the prior-art is that the resonance of the chip is fixed which prevents "any to any" wavelength conversion. The present invention overcomes this by using the SOA 5, to convert any input wavelength to a fixed-wavelength output 7 provided by a pump 6 which is resonant to the wavelength converter chip. In addition, the prior-art enabled only conversion of linearly polarized optical input. The SOA accepts input in any polarization but produces linearly polarized output which can be efficiently converted by the wavelength converter.

The input data signal 12 is frequency doubled in the waveguide with a transmission reponse as shown in 1A. The doubled signal power scales as the square of the input signal power, so noise on the zeros of the data (lower intensity portion) is suppressed. The doubled signal acts as a pump for difference frequency generation (DFG) with the external input source from the transmitter (Tx) 13, to generate a wavelength-converted output 14, containing the original data from the signal but with noise reduction on its zero's. A controller 15 can be used to adjust the signal input power, transmitter power, or the gain of the SOA 5.

Regeneration of "One" Bits

Figure 2:
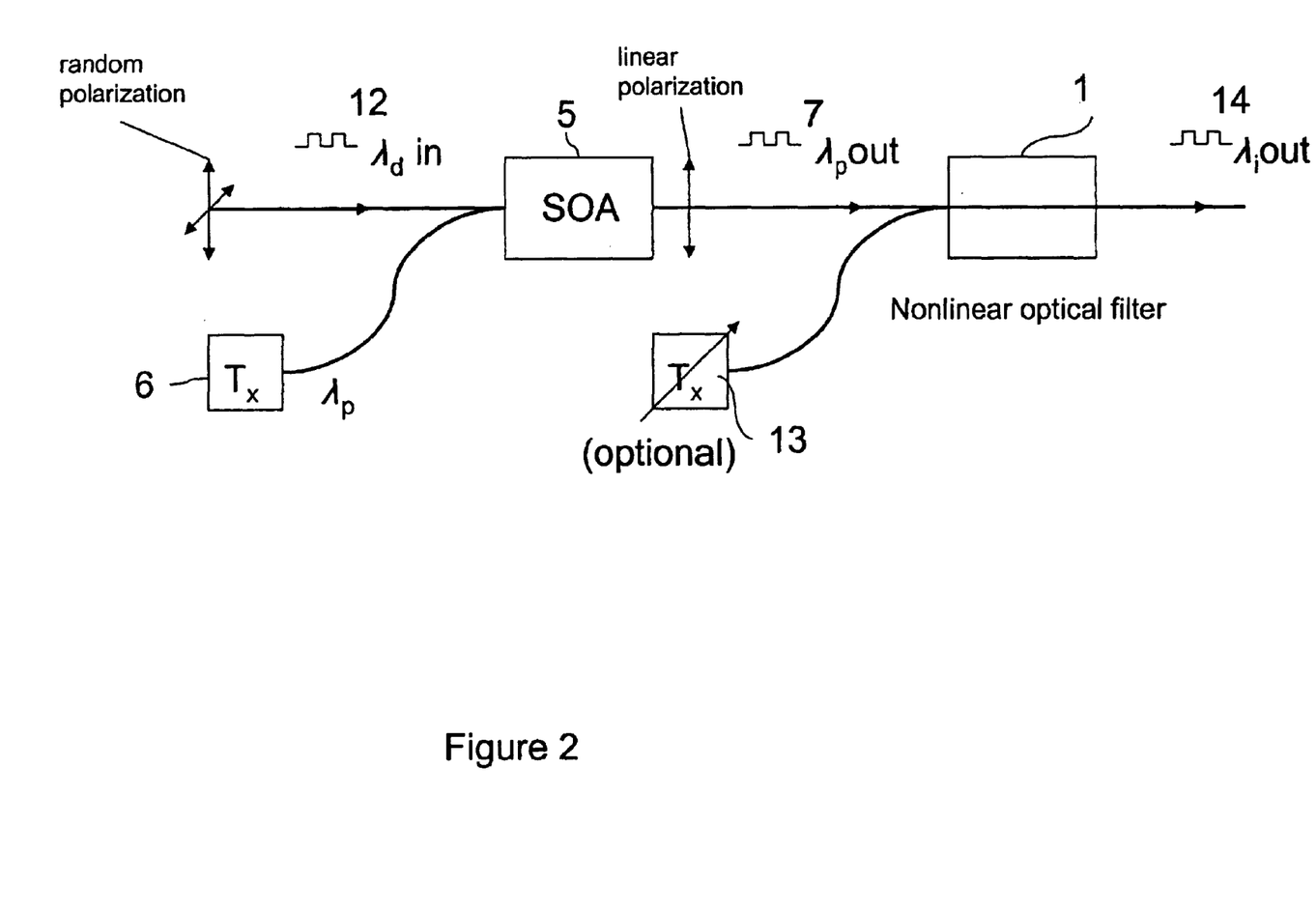
FIG. 2 is a block diagram of the present invention for optical regeneration, showing a nonlinear optical filter with transfer function shown in FIG. 2A (based upon a wavelength converter using PPLN or fiber four-wave mixing) connected with network control with a single chip converter, according to one embodiment of the present invention.
Figure 2A:
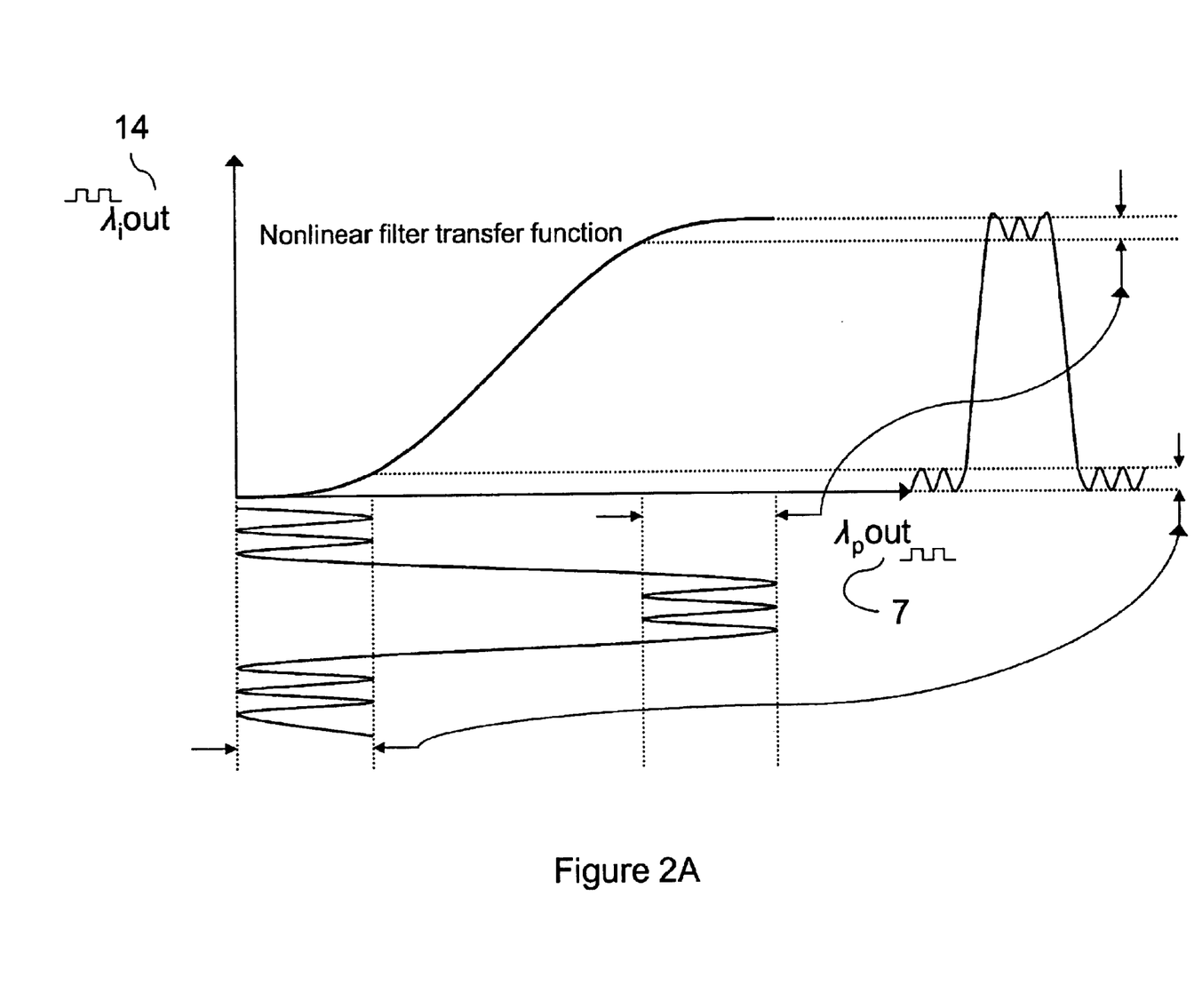

In another embodiment of the present invention, as shown in FIG. 2, input signal 12, undergoes wavelength conversion from any wavelength input to an optical output at the wavelength of input source 6, by mixing in the SOA 5 with input source 6, to produce linearly polarized output 7. The SOA output 7, is input to nonlinear optical filter 1, consisting of either a wavelength converter chip as described above or a nonlinear optical fiber. The SOA output has the benefit of higher power than the input, however the extinction ratio and noise figure are degraded due to the SOA's characteristics. The nonlinear optical filter has an optical transfer function as shown in FIG. 2A, and "cleans up" the output of the SOA, by improving the extinction ratio and suppressing the noise on the digital 1's (or 0's). The nonlinear optical filter may optionally include a second external light source 13.

Interferometric Regenerator

Figure 3:
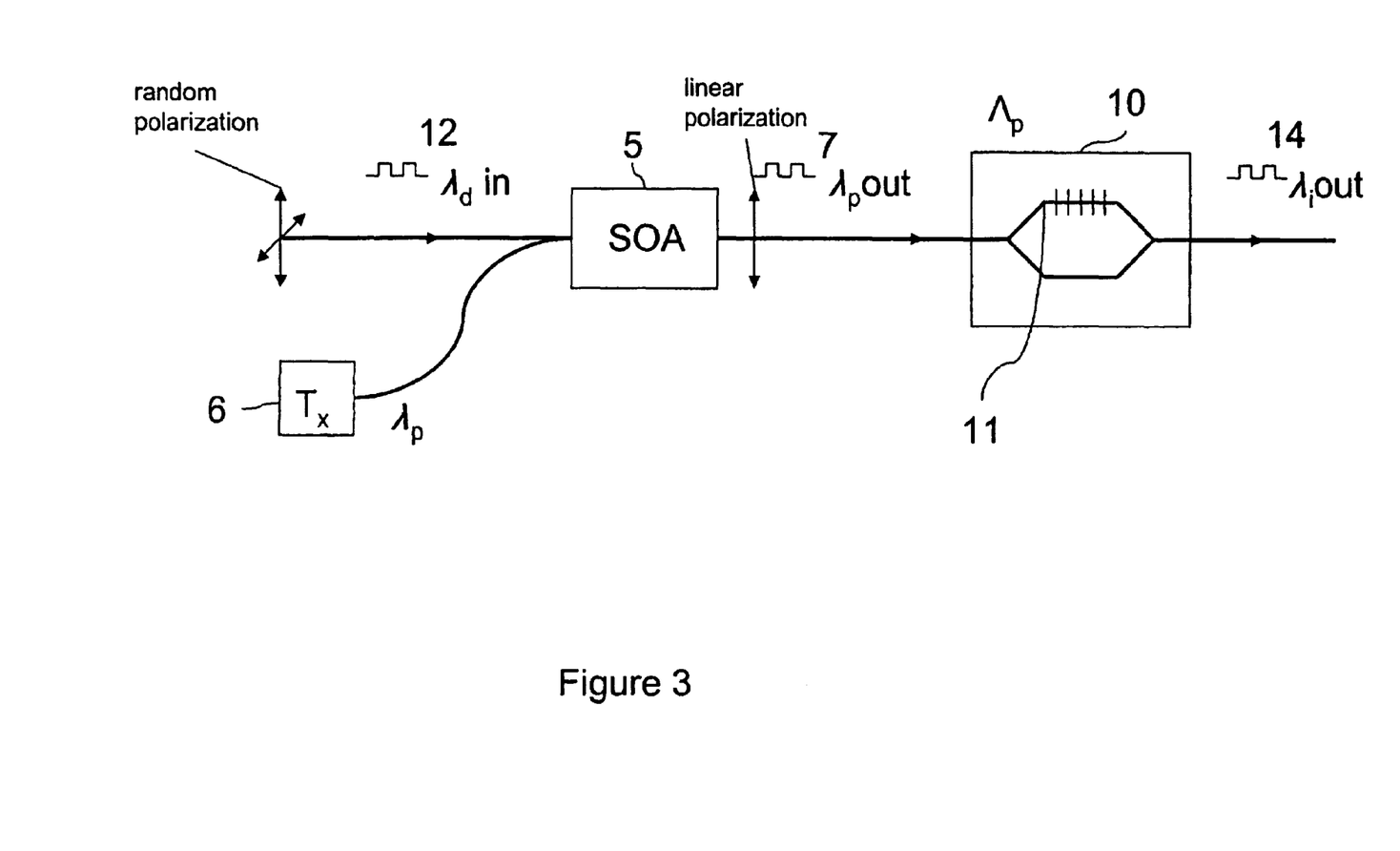
FIG. 3 illustrates an interferometric regenerator in which doubling of the input signals in 1 are of a Mach Zhender, unbalances the interferometer and enables output of the transmitter Tx.

In another embodiment of the present invention, as shown in FIG. 3, regeneration & "any-to-one" wavelength conversion are accomplished by employing a Mach-Zehnder interferometer with a periodically poled region 11 in one arm. The interferometer is balanced, such that in the absence of other input, the light input from the output of SOA 5 destructively interferes at the output of the Mach-Zehnder interferometer. The poled region 11 frequency doubles the SOA output 7. Since the doubling process is non-linear, the noise on the "zeros" of the signal data is suppressed, resulting in an enhanced signal to noise ratio of the output 14 with respect to the input signal 7.

Figure 4:
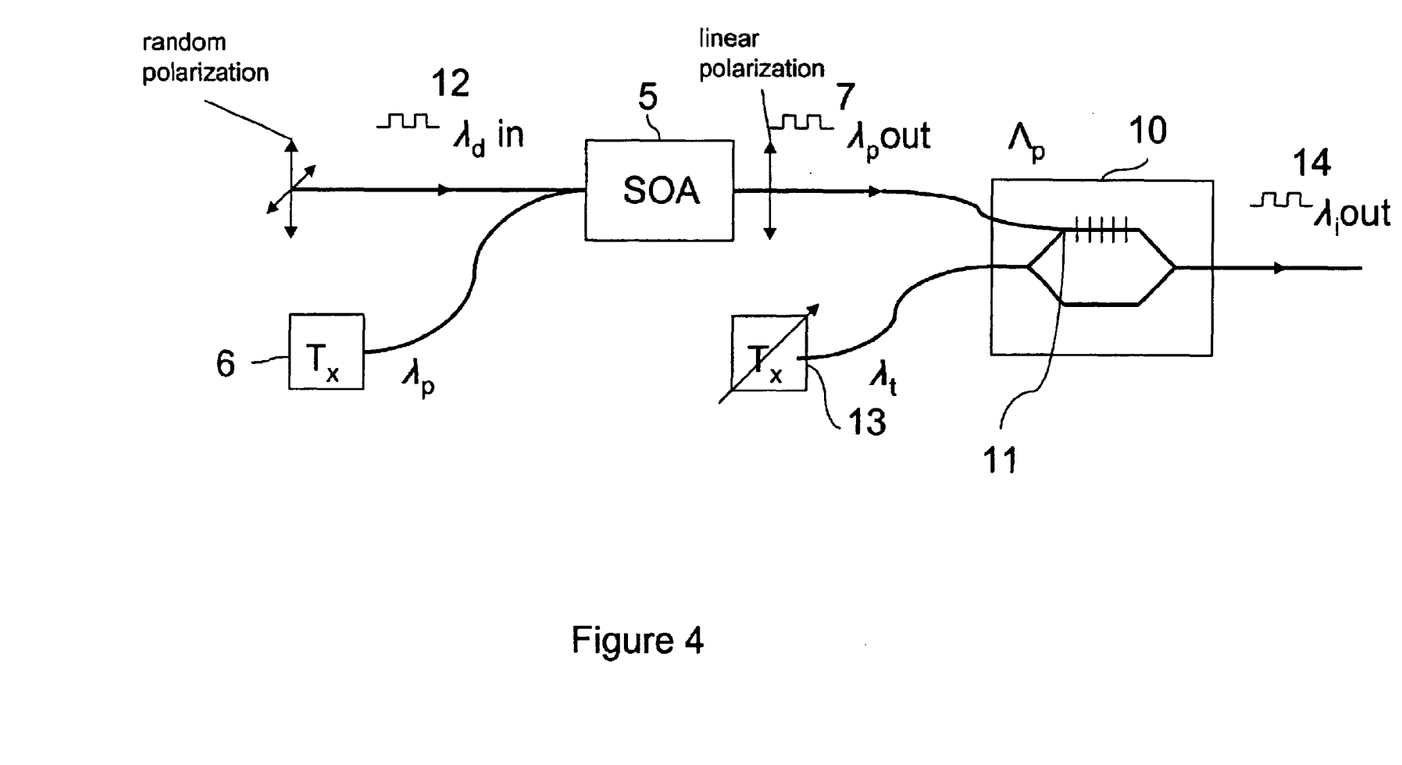
FIG. 4 is a block diagram of a 2-stage hybrid optical regenerator using an interferometric stage and a SOA stage.

Another embodiment is shown in FIG. 4, accomplishes any-to-any wavelength conversion and regeneration by employing a Mach-Zehnder interferometer with a periodically poled region 11 in one arm. The input data 12 is first wavelength converted from any wavelength to a fixed wavelength output by mixing in the SOA 5 with transmitter source 6. The modulated output of the SOA 7, is then input to the second port of the Mach Zhender where it interacts with the poled region which is resonant with that wavelength.

The SOA output 7 acts as a pump for the wavelength conversion process in the optical chip 10. The difference frequency generation process both converts the tunable transmitter 13 wavelength to its "mirror image" around the second harmonic of the pump, and also amplifies the original Tx channel. The increased power in one arm of the Mach-Zehnder unbalances the interferometer, and enables output at the transmitter wavelength. Since the wavelength conversion only takes place when power is present at the signal wavelength, then the modulation of the signal is replicated on the output 14.

Since the wavelength conversion process first frequency doubles the signal and then uses it as a pump, and since the doubling process is non-linear, the noise on the "zeros" of the signal data is suppressed, resulting in an enhanced signal to noise ratio of the transmitter output with respect to the input signal.

Further, since the wavelength converter is operating in amplification mode, the noise figure for the process is substantially reduced over that of the usual wavelength conversion (or difference frequency generation) mode. Firstly, the amplification process has a noise figure below 3 dB (and in-fact is zero for unity gain—i.e., no amplification), compared to the wavelength conversion process whose noise figure is larger because it is creating a new wavelength from nothing against a quantum noise background. In this process, any noise is being added to a strong transmitter so that the ratio of signal to noise is substantial higher than in the wavelength conversion case. Thus this device performs signal cleanup or optical regeneration of the original data.

Furthermore, if the Tx is tunable, then output can be achieved at any wavelength, achieving any-to-any wavelength conversion and regeneration in a single device.

Nonlinear Optical Fiber

Figure 5:
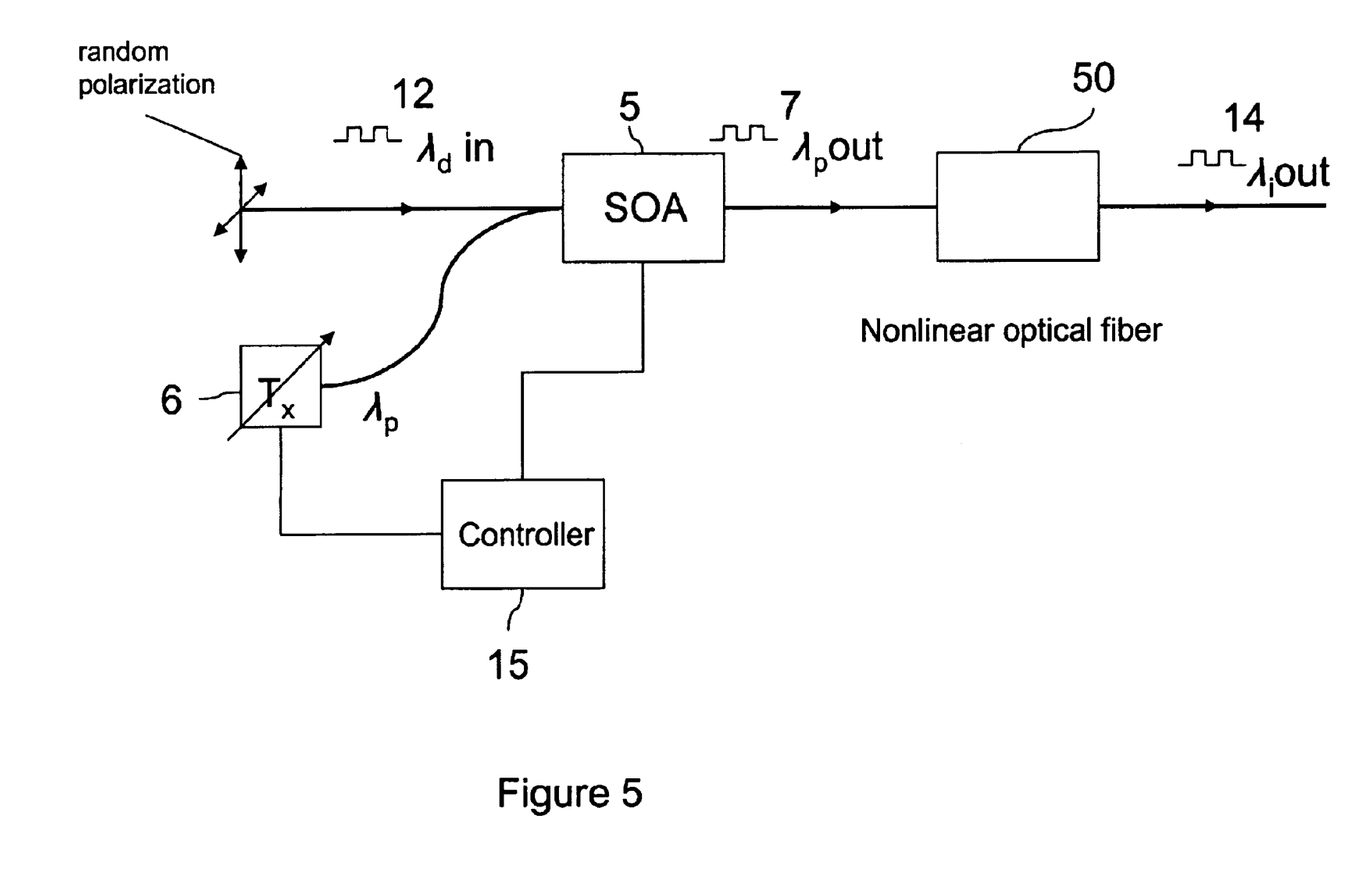
FIG. 5 A 2-stage regenerator/wavelength converter employing an SOA and a nonlinear optical fiber.
Figure 5A:
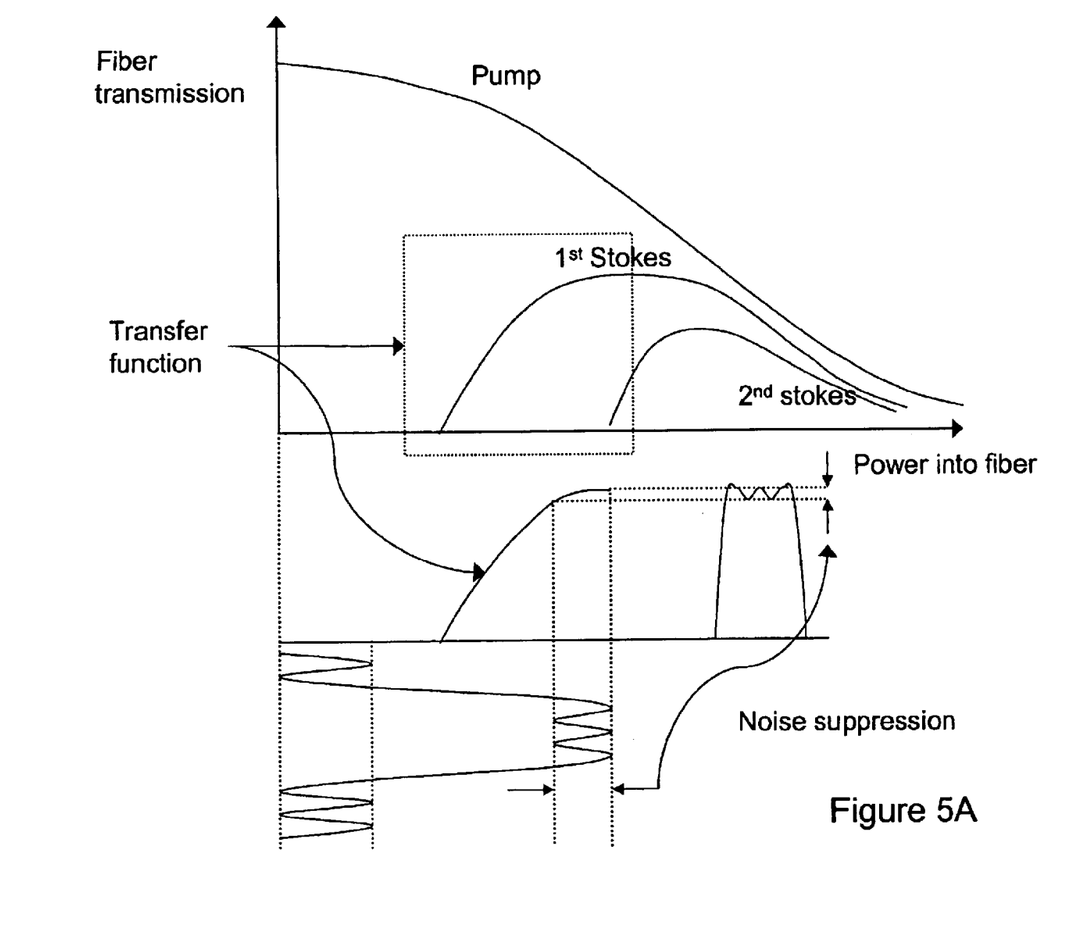

In another embodiment, shown in FIG. 5, the wavelength conversion function is accomplished by the SOA, as in the previous embodiment. However, the output wavelength 7 of the SOA is tunable, and chosen so as to achieve a desired final wavelength 14. The SOA output 7 is input to a nonlinear optical fiber 50 with the nonlinear transfer function shown in 5a. The $3^{rd}$ order nonlinearity of the fiber can be one of four-wave mixing, Kerr effect, Brillouin scattering, Raman scattering, or cross-phase modulation. In the case of Raman scattering, there is a distinct pump intensity threshold below which Raman scattering cannot occur. Thus, noise on the digital zero's is completely suppressed in the converted output 14 provided it remains below the Raman scattering threshold. The controller 15 adjusts the SOA bias, gain, or the Tx power to ensure that the noise remains below threshold. The pump is converted to a new wavelength called the first Stokes output. The pump wavelength (output of the SOA is chosen to ensure that the $1^{st}$ Stokes output is at the desired final wavelength. Furthermore, the conversion saturates at higher intensities due to the onset of the second Stokes output, thus noise on the digital 1's is likewise suppressed.

Retiming & Reshaping

Figure 6:
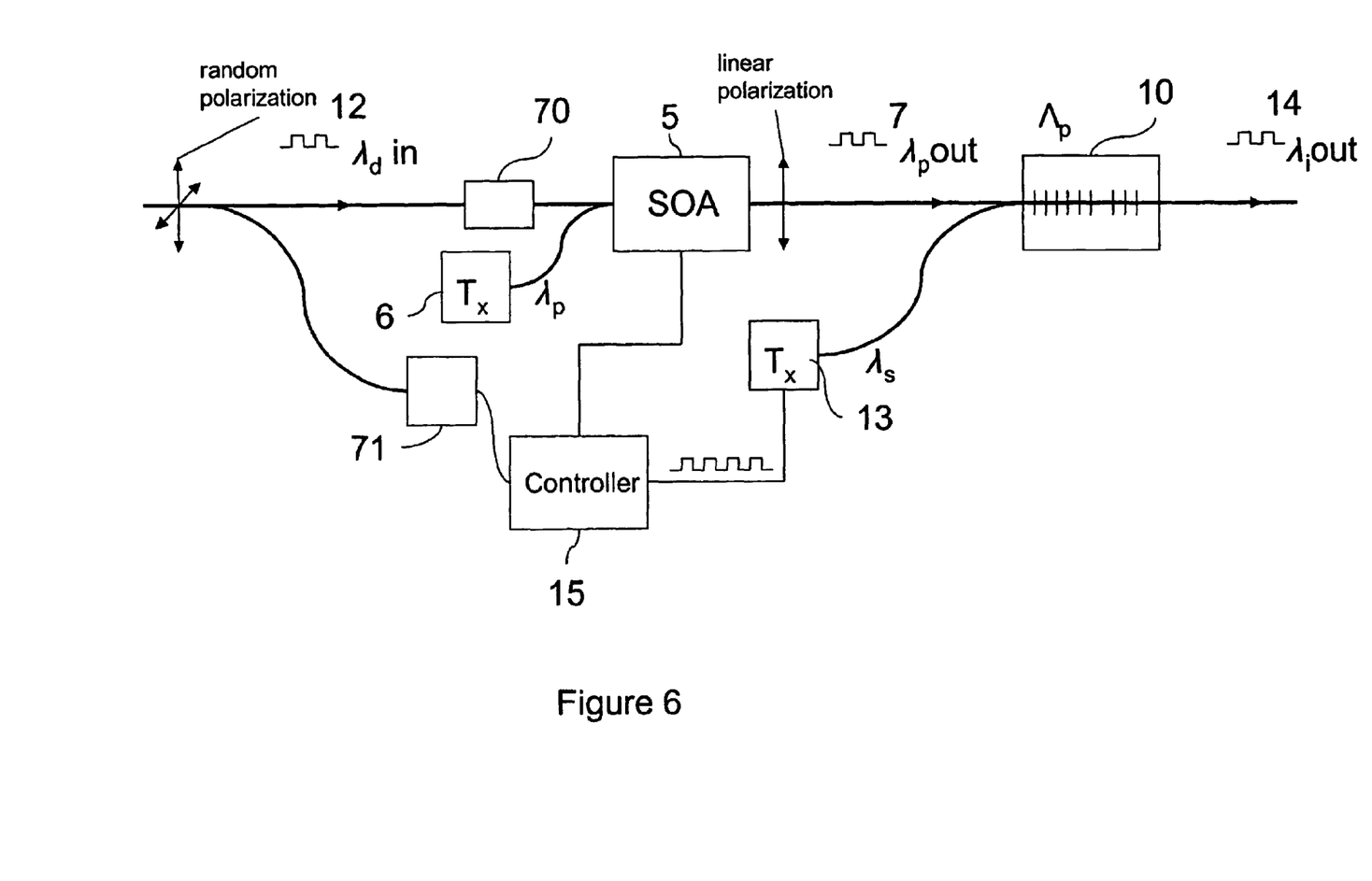
FIG. 6 is a block diagram of a 3R optical regenerator performing regeneration, reshaping, and retiming.
Figure 6A:
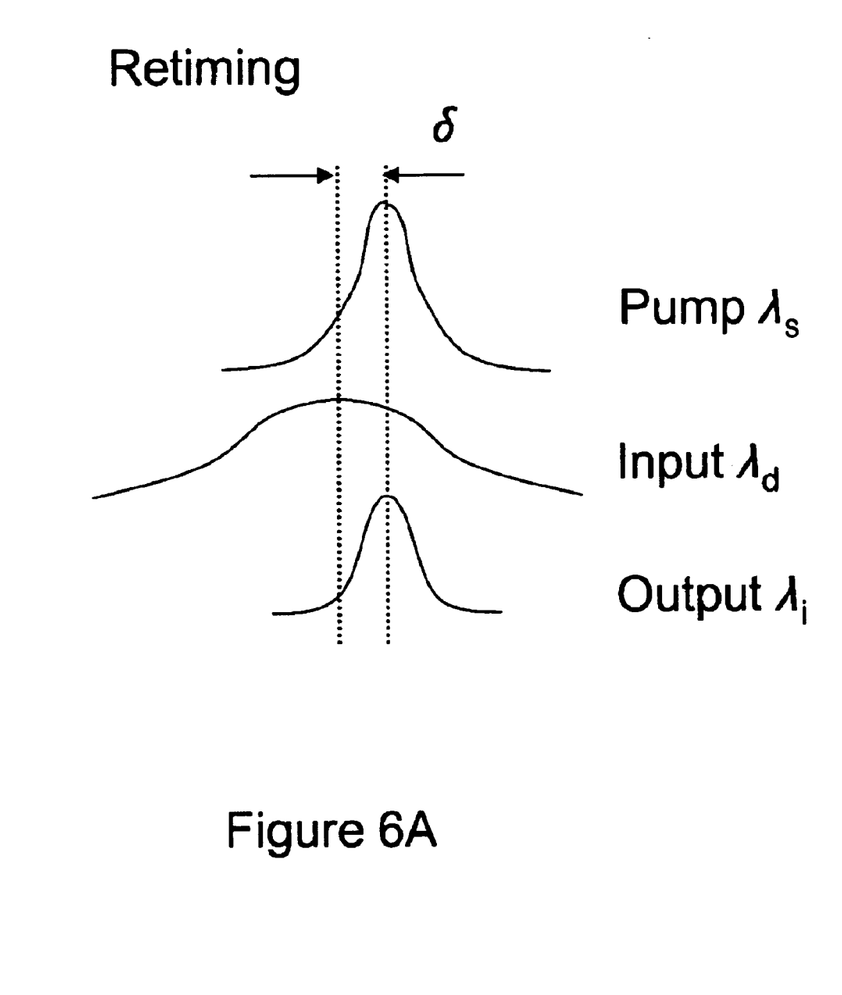
FIG. 6A illustrates the retiming characteristics of the present invention.

FIG. 6 shows an embodiment for optical retiming. An optical delay line 70 is used to delay input signals while the clock phase is recovered by a detector and signal processor 71. The recovered clock signal is used to match the phase of the input clock signals with that of the clocked pump Tx 13. Note that in this embodiment, the Tx is not CW but modulated at the bit rate of the input signals 12. Since the wavelength conversion and regeneration processes depend upon the presence of both input signal and external Tx, then conversion only occurs when both are present. FIG. 6a shows the effect of offsetting the phase of the pump Tx and input signals to achieve a re-timed converted output.

Figure 6B:
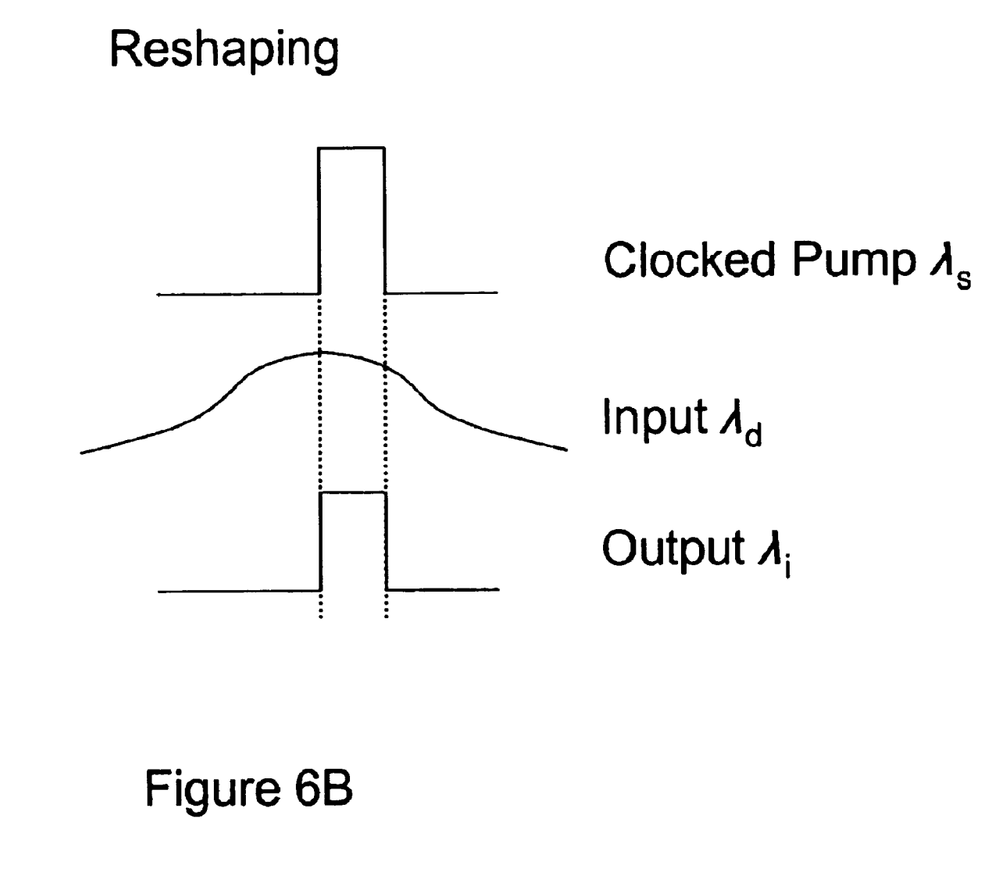
FIG. 6B illustrates the reshaping characteristics of the present invention.

FIG. 6b shows the temporal overlap of Tx and signal, which effectively reshapes the input signal onto the converted or regenerated signal. The desired reshaped output is a convolution of the input Tx and signal pulse shape and can be controlled by adjusting the Tx pulse shape.

Therefore, while the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. An any-to-any wavelength converter comprising:
    a Semiconductor optical amplifier wavelength converter, accepting an external optical signal, modulated with data, and producing an $1^{st}$ output wavelength an optical chip with at least one waveguide;
    a CW laser, input to the waveguide;
    a $2^{nd}$ input port accepting an external optical signal, modulated with data; and
    at least one periodically poled region, within said waveguide, with at least one resonant wavelength matched to that of the $1^{st}$ output wavelength (of the SOA), such that the external optical signal acts as a pump for wavelength conversion of the CW laser.

2. The any-to-any wavelength converter of claim 1, wherein the CW laser is tunable.

3. The any-to-any wavelength converter of claim 1, including a filter on the output of the waveguide which removes the signal wavelength.

4. The any-to-any wavelength converter of claim 1, comprising:
    a plurality of waveguides;
    a plurality of poled regions with a plurality of different resonant wavelengths;
    a plurality of external optical filters that selectively direct an external optical signal into the waveguide containing the poled region that is resonant with the external optical signal.

5. A one-to-any wavelength converter, comprising:
    a Semiconductor optical amplifier wavelength converter, accepting an external optical signal, modulated with data, and producing an $1^{st}$ output wavelength;
    an optical chip with at least one waveguide;
    an optical chip with a plurality of waveguides;
    a tunable CW laser, used as a pump to energize the optical chip;
    an input port accepting an external optical signal, modulated with data;
    at least one periodically poled region, within each waveguide, with at least one resonant wavelength matched to the $1^{st}$ output wavelength; and
    an optical switch which selectively directs both the CW pump and the external optical signal into the waveguide with the poled region whose resonant wavelength matches that required to achieve a pre-determined optical shift.

6. The one-to-any wavelength converter of claim 5 having a filter on the output of each waveguide with removes the pump wavelength resonant with the poling structure within that waveguide.

7. The one-to-any wavelength converter of claim 5, including an external controller that accepts an external input to determine the required optical shift, with a pre-determined switching algorithm that tunes the CW laser, and operates the optical switch, so as to direct the CW laser and external optical signal into the appropriate waveguide to achieve the required shift.

8. A one-to-any wavelength converter, comprising:
    a Semiconductor optical amplifier wavelength converter, accepting an external optical signal, modulated with data, and producing an $1^{st}$ output wavelength;
    an optical chip with at least one waveguide;
    an optical chip with two waveguides forming a Mach-Zhender interferometer;
    a CW laser, input to the waveguide;
    a $2^{nd}$ input port accepting an external optical signal, modulated with data;
    at least 1 periodically poled region, within one arm of the Mach-Zhender, with at least 1 resonant wavelength matched to the $1^{st}$ output wavelength, such that the external optical signal acts as a pump for wavelength conversion of the CW laser.

9. The one-to-any wavelength converter of claim 8, wherein the CW laser is tunable.

10. The one-to-any wavelength converter of claim 8, wherein the input power of the external signal is adjusted so as to reduce noise on the input signal using the nonlinear transfer function of the wavelength conversion process.

11. The one-to-any wavelength converter of claim 8, wherein the input power of the CW laser is adjusted so as to reduce noise on the output signal using the nonlinear transfer function of the wavelength conversion process.

12. An optical regenerator comprising:
    a Semiconductor optical amplifier wavelength converter, accepting an external optical signal, modulated with data, and producing an $1^{st}$ output wavelength;
    an optical chip with at least one waveguide;
    an optical chip with at least one waveguide;
    a CW laser, input to the waveguide;
    a $2^{nd}$ input port accepting an external optical signal, modulated with data; and
    at least one periodically poled region, within said waveguide, with at least one resonant wavelength matched to the $1^{st}$ output wavelength, such that the external optical signal acts as a pump for frequency doubling followed by difference frequency generation of the CW laser.

13. The optical regenerator of claim 12, wherein the CW laser is tunable.

14. The optical regenerator of claim 12, including a controller which adjusts the power of at least one of the optical amplifier, transmitter Tx in response to the amplitude of the input signal so as to achieve noise reduction on the output.

15. An optical regenerator comprising:

a Semiconductor optical amplifier wavelength converter, accepting an external optical signal, modulated with data, and producing an $1^{st}$ output wavelength;

a nonlinear optical filter, with an optical transfer function which attenuates noise on the digital zero's and one's of the $1^{st}$ output wavelength;

a controller which adjusts at least one of the external optical signal, Semiconductor optical amplifier, or nonlinear filter to optimize the optical regeneration function.

16. The optical regenerator of claim 15, wherein the nonlinear optical filter is an optical chip with at least one waveguide, and at least one periodically poled region which controls the nonlinearity of the filter.

17. The optical regenerator of claim 15, wherein the nonlinear optical filter is a nonlinear optical fiber whose nonlinearity includes at least one of four-wave mixing, Kerr effect, Brillouin scattering, Raman scattering, or cross-phase modulation.

18. An any-to-any wavelength converter comprising:

a Semiconductor optical amplifier wavelength converter, accepting an external optical signal, modulated with data, and producing an $1^{st}$ output wavelength;

a nonlinear optical filter, with an optical transfer function which attenuates noise on the digital zero's and one's of the $1^{st}$ output wavelength;

a controller which adjusts at least one of the external optical signal, Semiconductor optical amplifier, or nonlinear filter to optimize the optical regeneration function.

19. The any-to-any wavelength converter of claim 18, wherein the nonlinear optical filter is an optical chip with at least one waveguide, and at least one periodically poled region which controls the nonlinearity of the filter.

20. The any-to-any wavelength converter of claim 18, wherein the nonlinear optical filter is a nonlinear optical fiber whose nonlinearity includes at least one of four-wave mixing, Kerr effect, Brillouin scattering, Raman scattering, or cross-phase modulation.

* * * * *